United States Patent
Vieira et al.

(10) Patent No.: US 7,972,570 B2
(45) Date of Patent: Jul. 5, 2011

(54) DISTRIBUTOR NOZZLE FOR A TWO-PHASE CHARGE IN FIXED-BED REACTORS

(75) Inventors: Jose Antonio Vidal Vieira, Rio de Janeiro (BR); Wilson Kenzo Huziwara, Rio de Janeiro (BR); Donizeti Aurelio Silva Belato, Rio de Janeiro (BR); Ademaro Marchiori, Rio de Janeiro (BR); Jorge Roberto Duncan Lima, Rio de Janeiro (BR); Fabricio Torres, Rio de Janeiro (BR); Carlos Otavio Brito, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 298 days.

(21) Appl. No.: 12/277,428

(22) Filed: Nov. 25, 2008

(65) Prior Publication Data

US 2009/0155147 A1    Jun. 18, 2009

(30) Foreign Application Priority Data

Dec. 13, 2007   (BR) .................................... 0704849

(51) Int. Cl.
*B01J 8/02* (2006.01)
(52) U.S. Cl. .......... 422/220; 422/604; 422/607; 216/96; 216/97; 210/97; 210/153
(58) Field of Classification Search .................. 422/194, 422/195, 220, 604, 607; 216/96, 97, 114.2; 210/97, 153
See application file for complete search history.

(56) References Cited

U.S. PATENT DOCUMENTS

| | | | | |
|---|---|---|---|---|
| 1,770,221 A | * | 7/1930 | Sweeny | 261/114.2 |
| 2,061,830 A | * | 11/1936 | Campbell | 261/113 |
| 3,488,037 A | * | 1/1970 | Landau et al. | 366/335 |
| 3,685,971 A | | 8/1972 | Carson | |
| 4,140,625 A | | 2/1979 | Jensen | |
| 4,159,291 A | * | 6/1979 | Bruckert et al. | 261/114.1 |

(Continued)

FOREIGN PATENT DOCUMENTS

GB          1 353 637          5/1974

(Continued)

OTHER PUBLICATIONS

European Search Report dated Apr. 2, 2009 issued in corresponding EP Application No. 08 25 3950.

*Primary Examiner* — Walter D Griffin
*Assistant Examiner* — Huy-Tram Nguyen
(74) *Attorney, Agent, or Firm* — Nixon & Vanderhye, PC

(57) ABSTRACT

A distributor nozzle for a two-phase charge, to be used in fixed-bed reactors in order to increase the area over which the mixture is dispersed and to make its flow rate the same over the whole area of the bed in the reactor. The device includes a number of fixing bars and a deflector cone frustum. The deflector cones or cone frusta may have more than one angle in order to improve the distribution, and they have a number of apertures or slits and a number of vertical directing elements or a directing cage or frame to direct the stream of the two-phase charge in order to increase the area over which the mixture is dispersed and to make its flow rate the same over the entire area of the bed in the reactor.

9 Claims, 6 Drawing Sheets

U.S. PATENT DOCUMENTS

| | | |
|---|---|---|
| 5,158,714 A | 10/1992 | Shih et al. |
| 5,403,561 A * | 4/1995 | Koros et al. .................. 422/195 |
| 5,462,719 A | 10/1995 | Pedersen et al. |
| 5,484,578 A | 1/1996 | Muldowney et al. |
| 5,554,346 A * | 9/1996 | Perry et al. .................... 422/195 |
| 6,540,213 B2 * | 4/2003 | Bachmann et al. ............. 261/97 |
| 6,613,219 B2 | 9/2003 | Harter et al. |
| 7,506,861 B2 | 3/2009 | Müller |
| 7,674,439 B2 | 3/2010 | Jacobs et al. |
| 2005/0163682 A1 * | 7/2005 | Jacobs et al. .................. 422/228 |
| 2006/0163758 A1 | 7/2006 | Muller |

FOREIGN PATENT DOCUMENTS

| | | |
|---|---|---|
| WO | WO 2005/068039 | 7/2005 |

* cited by examiner

DISTRIBUTOR NOZZLE FOR A TWO-PHASE CHARGE IN FIXED-BED REACTORS

CROSS REFERENCE TO RELATED APPLICATION

This application claims the benefit of Brazil Patent Application No. PI 0704849-1 filed on 13 Dec. 2007, incorporated herein by reference in its entirety.

FIELD OF THE INVENTION

The present invention relates to a distributor nozzle for a two-phase (gas/liquid) charge for use in fixed-bed reactors.

BASIS OF THE INVENTION

The growing worldwide demand for fuels with a lower percentage on pollutants has called for more rigorous fuel specifications, especially as regards the sulphur content. Keeping up with this trend, the manufacturers of petroleum products have invested heavily to improve their refineries, mainly by installing new hydrofining units. These units are designed with rather strict criteria, so as to be able to meet the new specifications for fuels. One of the solutions adopted for this purpose lies in the development of new designs for the inside of reactors, with special emphasis on the quality of distribution.

Hydrofining processes normally use reactors with a downward flow, in which the charge enters at the top of the reactor and is directed towards the catalyst bed. The aim of these units is achieved by chemical reactions that take place in the reactors of these units, where the charge and hydrogen react with each other in the presence of one or more catalyst beds under suitable operational conditions to give the required product.

In processes where the reactor charge is in liquid or partially vaporized form, there are two factors that ensure a good distribution of the stream over the catalyst bed: the main charge distributor and the liquid distributor plate in which the distributors are arranged. The purpose of the distributor plate is to promote the uniform radial distribution of the liquid through the catalyst bed in order to ensure the best contact between the reagents and the catalyst, fully utilizing the amount of catalyst available in the reactor. An irregular distribution of the liquid in the catalyst bed contributes to channeling and the formation hot-spots. These lead to an inefficient utilization of the catalyst, as well as to inactivation and coke formation, reducing the yield of the process and shortening the service life.

The design of the distributor plate for fixed-bed reactors typically has two objectives: the first is to ensure a full coverage, which usually means maximizing the number of points through which the distributor plate disperses the fluid over the catalyst bed. The second is to ensure a uniform coverage, so that the same amount of fluid is dispersed to all points of the bed. To reach this aim, one of the strategies employed is to use high-performance distributors that ensure the best distribution of the liquid over the catalyst bed in the reactor.

The aim of the present invention is to improve the quality of distribution and the liquid/vapour contact by so designing the geometry and dimensions of the distributor nozzle as to improve the liquid/vapour contact and ensure that the liquid leaving the nozzle through its lower end is dispersed in such a way that the top layer of the bed in the reactor is wetted uniformly.

The present invention comprises an optimized distributor nozzle that consists of a deflector cone, which can wet an area of the bed below it without depending on the action of adjacent nozzles. This improves the quality of the distribution and minimizes the "shading" or blocking effect of the fixing bars, without restricting the outlet area in comparison with the inlet apertures. To ensure the wetting of the area lying directly below the deflector cone, the present invention provides slits or holes formed in the body of the deflector cone. Small vertical flow-directing elements can also be used at the bottom of the cone, as can directing frames or "cages", whose role is to redistribute the flow. Furthermore, the spacing, dimensions and other details are chosen to minimize the areas left dry by the "shading" or blocking effect of the fixing bars.

RELEVANT PRIOR ART

Various types of distributor nozzles for liquids and gases have been patented, but many of them are simply modifications or variants of old designs.

One of the simplest devices comprises little more than a plate with holes in it, while others have various forms of shafts, apertures, baffles, holes or more complicated elements to ensure the required liquid and vapour stream.

U.S. Pat. No. 5,158,714 describes a bubbler-type device for the distribution of fluids whose main feature lies in the inclusion of a disperser at the bottom to ensure a better mixing between the two phases. However, the device claimed in U.S. Pat. No. 5,158,714 has a low mixture-dispersing capacity, and so its area of action is small.

U.S. Pat. No. 5,462,719 describes a method and device for mixing and distributing fluids in multi-bed reactors with a downward flow. The device described in U.S. Pat. No. 5,462,719 comprises distributor nozzles that have a cap, an opening at the top of the lateral surface for the flow of the vapour, and holes in the sides at three different levels for the flow of the liquid. However, this device similarly has a low mixture-dispersing capacity, and so its area of action is small.

U.S. Pat. No. 5,484,578 describes a system for the distribution of two-phase fluids in reactors with downward flow, which system consists of a distributor plate fitted with a number of distributor nozzles. These distributor nozzles have side holes at two different levels, with a fixed distance from the base of the distributor plate, in order to keep a certain liquid level above the tray. These distributor nozzles also have a focused outflow and therefore a small area of action.

U.S. Pat. No. 6,613,219 B2 describes a system for the distribution of two-phase fluids in reactors with downward flow. This device comprises a distributor nozzle, characterized in that it has side apertures, an opening at the top and a dispersing system at the bottom, which consists of a perforated deflector plate, whose role is to increase the area over which the distributor nozzle acts.

A US patent published as WO 2005/068039 A1 describes a system for the distribution of two-phase fluids in reactors with a downward flow. This distribution system comprises a distributor plate fitted with various distributor nozzles, characterized by having two chambers with a rectangular cross-section, one for upward flow and one for downward flow, in order to ensure the mixing of the two fluids. However, these distributor nozzles have a focused outflow and therefore a small area of action.

The device that forms the subject of the present invention comprises a distributor nozzle for a two-phase charge for use in fixed-bed reactors, which device comprises a deflection system at its outlet in order to increase the area over which the mixture is dispersed and to ensure that it has a uniform flow rate over the whole area of the bed in the reactor. The advantage of the distributor nozzle proposed here is that it is simple to make and uses materials that are well-known in the art.

SUMMARY OF THE INVENTION

The present invention relates to a distributor nozzle for a two-phase charge, for use in fixed-bed reactors, which distributor nozzle is used to increase the area over which the mixture is dispersed and to ensure its uniform flow rate over the whole area of the bed in the reactor.

The distributor nozzle proposed in this invention consists of the following basic parts, but each of these can have several alternative constructions:

a) a deflector cone or a deflector cone frustum, which may be solid or hollow and whose angle can vary between 60 and 170°,
b) fixing bars or legs for fixing the cone in the shaft, which are vertical or inclined towards the inside or outside wall of the shaft and extend from the top, bottom or side of the cone, and
c) flow-redirecting elements to ensure the wetting of the area that lies directly under the cone.

BRIEF DESCRIPTION OF THE FIGURES

The invention will now be described in detail with reference to the drawings mentioned above, which are attached only by way of example but are an integral part of the present description, where.

DETAILED DESCRIPTION OF THE INVENTION

Figure 1:
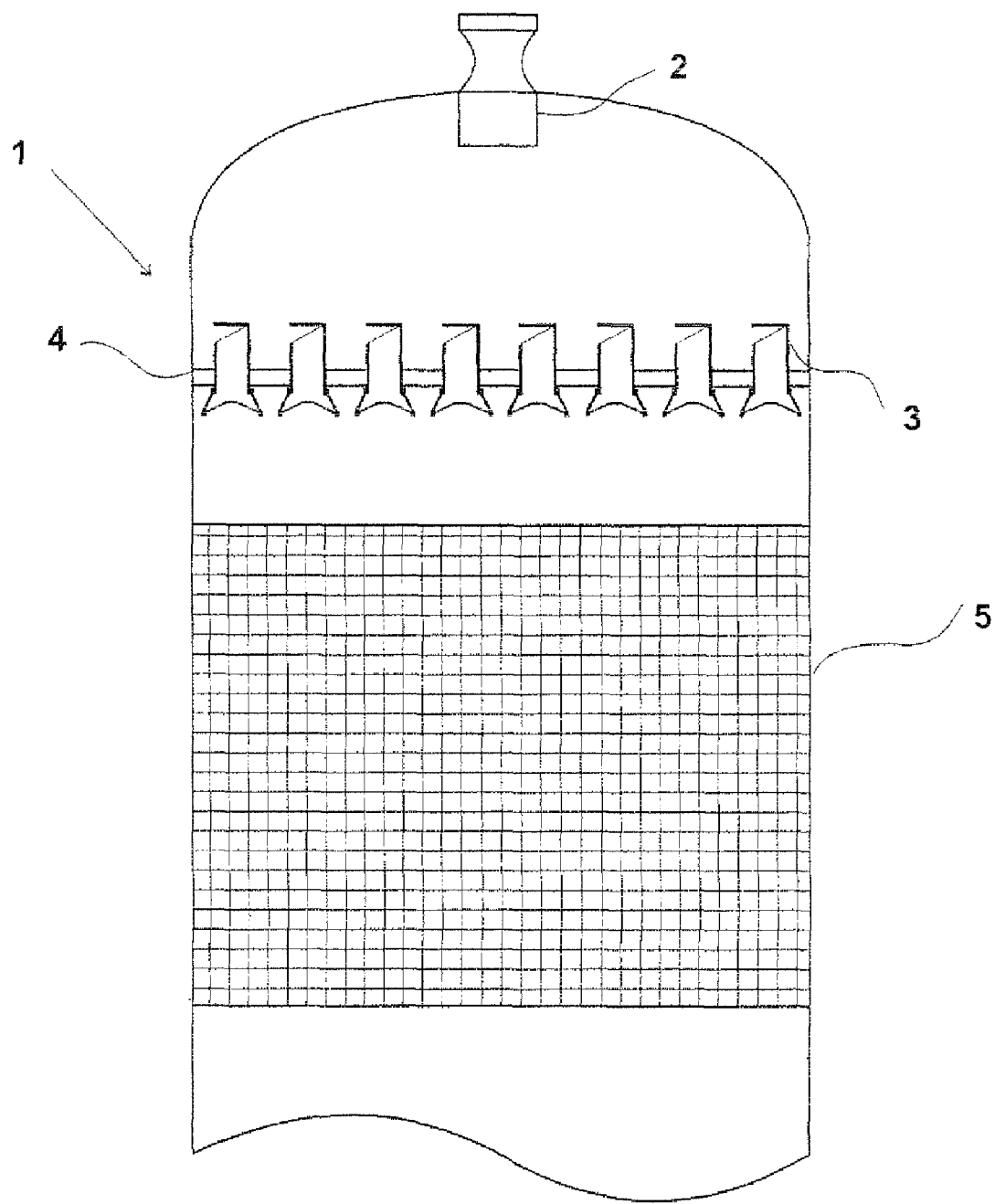
FIG. 1 shows a schematic drawing of a fixed-bed reactor

FIG. 1 shows a simplified drawing of a fixed-bed reactor (1) in which distributors (3) are used. The two-phase charge enters the fixed-bed reactor (1) through a main charge distributor (2) and passes through a distributor plate (4) that has a number of distributors (3) in it. The charge passes through the distributors (3), whose role is to distribute the said two-phase charge homogeneously over the surface of the catalyst bed (5). It should be pointed out here that FIG. 1 is only included to illustrate the use of the distributor nozzles (3) and does not form part of the invention.

The distributor (3) can consist of a shaft and a distributor nozzle, but in the simplest versions it only consists of a shaft. The function of the distributor nozzle at the bottom of the shaft is to ensure a more homogeneous distribution of the charge over the catalyst bed. It should be pointed out that the shaft itself is not part of the present invention and is merely shown in FIGS. 2-6 to help explain the operation of the distributor nozzle.

The distributor nozzle according to the present invention consists of the following basic parts, each of which can have various structural alternatives:

A deflector cone or a deflector cone frustum, which may be solid or hollow and whose angle can vary between 45 and 170°.

The upper surface of the cone frustum has a diameter of 0-15 mm, while its bottom surface has a diameter of 15-60 mm. Alternatively, the cone or cone frustum can have more than one angle in order to improve the distribution and reduce the dry area lying in the "shadow" of the legs.

Fixing bars or legs for fixing the cone in the shaft, which bars or legs are vertical or inclined towards the inside or outside wall of the shaft and extend from the top, bottom or side of the cone.

Flow-redirecting devices to ensure the wetting of the area that lies directly below the cone.

These devices may be small channels, holes or slits formed in the deflector cone, or they may be vertical extensions of the cone itself (in the form of "teeth"), or else a combination of these devices with the legs, to help redirect part of the liquid stream.

Figure 2:
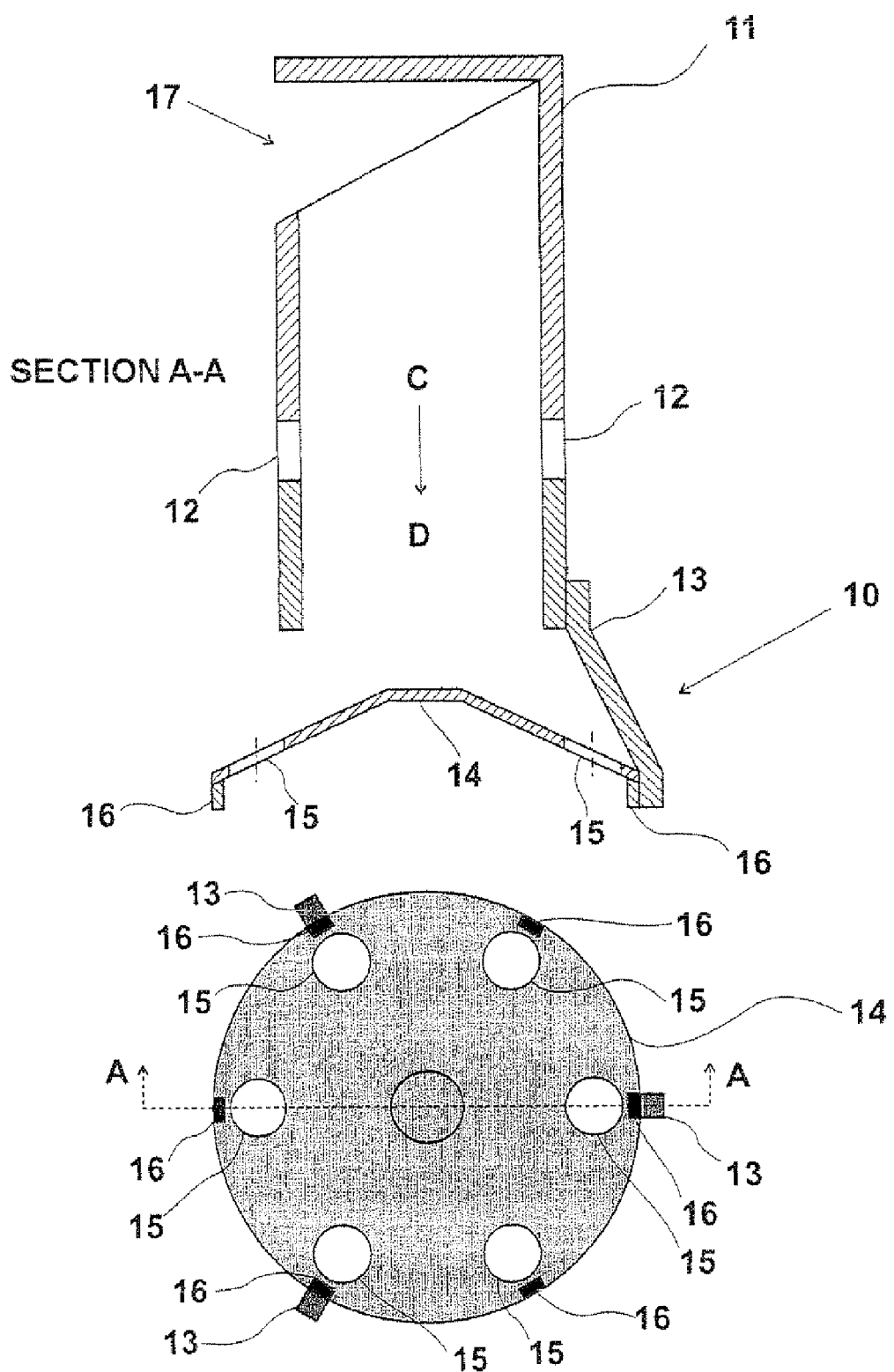
FIG. 2 shows the bottom view and a cross-section of the first embodiment of the distributor nozzle for a two-phase charge

FIG. 2 shows the first embodiment of a type of distributor nozzle (10) for a two-phase charge, comprising a number of fixing bars (13) and a deflector cone frustum (14). FIG. 2 also shows a shaft (11), which may be a cylindrical shell with an opening (17) at the top and a number of apertures (12) along its body.

The deflector cone frustum (14) can have an angle of 120°, six evenly spaced orifices (15) made in the cone, and a number of vertical directing elements (16) that are located at the edge of the cone and are aligned with the centres of the holes. The deflector cone frustum (14) is connected to the lower end of the shaft (11) with the aid of a number of fixing bars (13).

It should be noted that the angle of the deflector cone frustum (14), the number of apertures (15) in the cone, the number of vertical directing elements (16) and the number of fixing bars (13) must not be considered to limit the scope of the invention.

The two-phase mixture is passed into the fixed-bed reactor (1) under pressure, entering the shaft (11) both through the opening (17) and through the apertures (12). The vapour phase preferably enters the shaft through the opening (17), and the liquid phase preferably enters it through the apertures (12). Once inside the shaft (11), the two-phase mixture moves downward in the C-D direction. When it reaches the deflector cone frustum (14), the two-phase mixture is diverted towards the generatrix of the deflector cone frustum (14), and part of the mixture passes through the apertures (15) formed in the cone. The deflector cone is fitted with a number of vertical directing elements (16), pointing in the direction of the apertures (15) formed in the cone. The function of these directing elements is to help direct part of the two-phase stream flowing through the apertures (15) in the cone, so that it flows towards the bottom of the deflector cone frustum (14).

Figure 3:
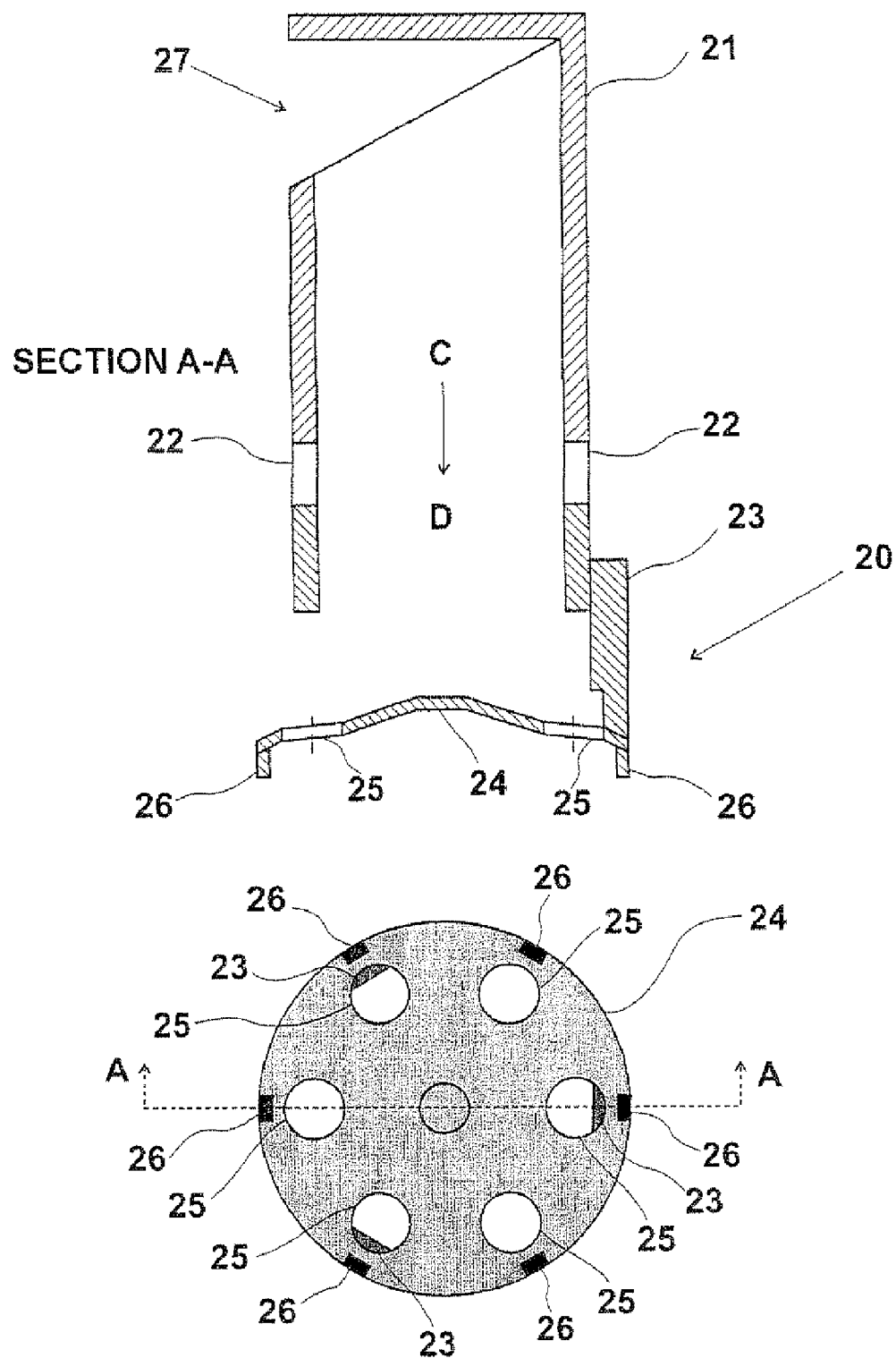
FIG. 3 shows the bottom view and a cross-section of the second embodiment of the distributor nozzle for a two-phase charge

FIG. 3 shows the second embodiment, which is another type of distributor nozzle (20) for a two-phase charge. This embodiment comprises a number of fixing bars (23) and a deflector cone frustum (24) that has more than one angle. FIG. 3 also shows a shaft (21), which is likewise a cylindrical shell with an opening (27) at the top and a number of apertures (22) along its body. The deflector cone frustum (24) is connected to the bottom of the shaft (21) with the aid of a number of fixing bars (23).

The truncated deflector cone (24) has some frusta with an angle of 120° and an angle of 80°, a number of evenly spaced apertures (25) which are formed in the cone and are located in the 80° cone frustum, and a number of vertical directing elements (26), located at the edge of the last cone frustum and aligned with the centres of the apertures (25) formed in the cone.

It should be noted that in the case of this embodiment the angles of the deflector cone frustum (24), the number of apertures (25) in the cone, the number of vertical flow-directing elements (26) and the number of fixing bars (23) must not be considered to limit the scope of the invention.

The two-phase mixture is passed into the fixed-bed reactor (1) under pressure, entering the shaft (21) both through the opening (27) and through the apertures (22). The vapour phase preferably enters the shaft through the opening (27), and the liquid phase preferably enters it through the apertures (22). Once inside the shaft (21), the two-phase mixture moves downward in the C-D direction. When it reaches the deflector cone frustum (24), the two-phase mixture is diverted towards the generatrix of the deflector cone frustum (24), and part of the mixture passes through the apertures (25) formed in the cone. The deflector cone is fitted with a number of vertical directing elements (26), pointing in the direction of the apertures (25) formed in the cone. The function of these directing elements is to help direct part of the two-phase stream flowing through the apertures (25) formed in the cone, so that it flows towards the bottom of the deflector cone frustum (24). In this embodiment, both the vertical directing elements (26) and the bottom of the fixing bars (23) have a rectangular cross-section. However, they can also have a different cross-section, such as trapezoidal, semicircular or trough-like.

Figure 4:
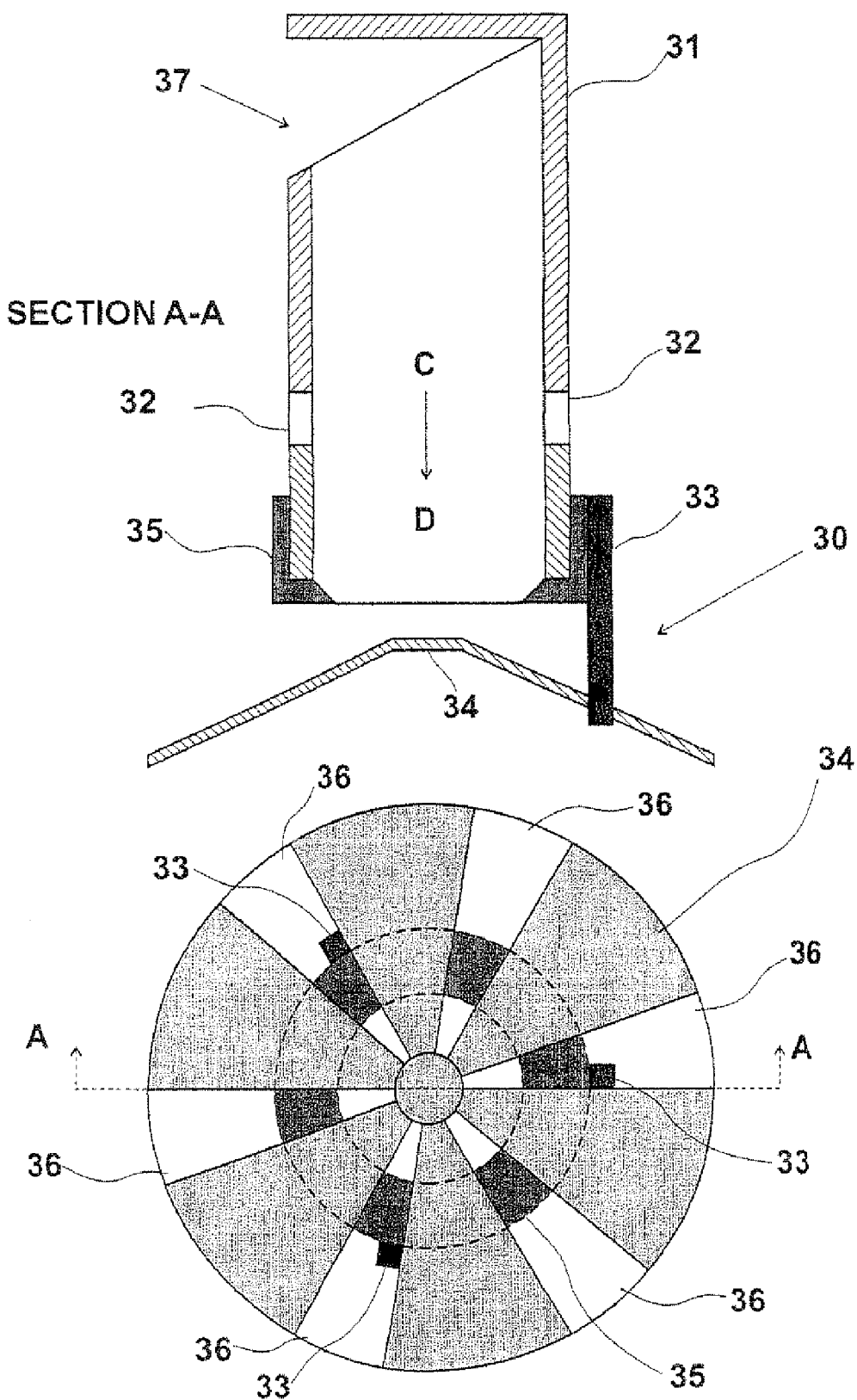
FIG. 4 shows a bottom view and a cross-section of the third embodiment of the distributor nozzle for a two-phase charge

FIG. 4 shows the third embodiment, which is another type of distributor nozzle (30) for a two-phase charge. This device comprises a number of fixing bars (33), an accelerating section (35) for the two-phase stream, and a deflector cone frustum (34). The shaft (31) shown in FIG. 4 can be a cylindrical shell with an opening (37) at the top and a number of apertures (32) along its body.

The truncated deflector cone (34) has a cone frustum with an angle of 120° and with a number of evenly spaced slots (36) formed in its upper surface. The deflector cone frustum (34) is connected to the acceleration section (35) with the aid of a number of fixing bars (33). The fixing bars (33) are connected to the accelerating section (35), where the diameter of the outlet end of the shaft (31) is reduced either at an angle or abruptly, in order to speed up the flow of the two-phase stream and so improve its distribution. The accelerating section (35) is fixed to the bottom of the shaft (31).

It should be noted that in the case of this embodiment too the angle of the deflector cone frustum (34), the number of slits (36), the number of fixing bars (33) and the percentage reduction in the flow area in the accelerating section (35) must not be considered to limit the scope of the invention.

The two-phase mixture is passed into the fixed-bed reactor (1) under pressure, entering the shaft (31) both through the opening (37) and through the apertures (32). The vapour phase preferably enters the shaft through the opening (37), and the liquid phase preferably enters it through the apertures (32). Once inside the shaft (31), the two-phase mixture moves downward in the C-D direction and is accelerated when flowing through the accelerating section (35). When the stream reaches the deflector cone frustum (34), the two-phase mixture is diverted towards the generatrix of the deflector cone frustum (44), and part of the mixture passes through the slits (36) to impinge on the area below the deflector cone frustum.

Figure 5:
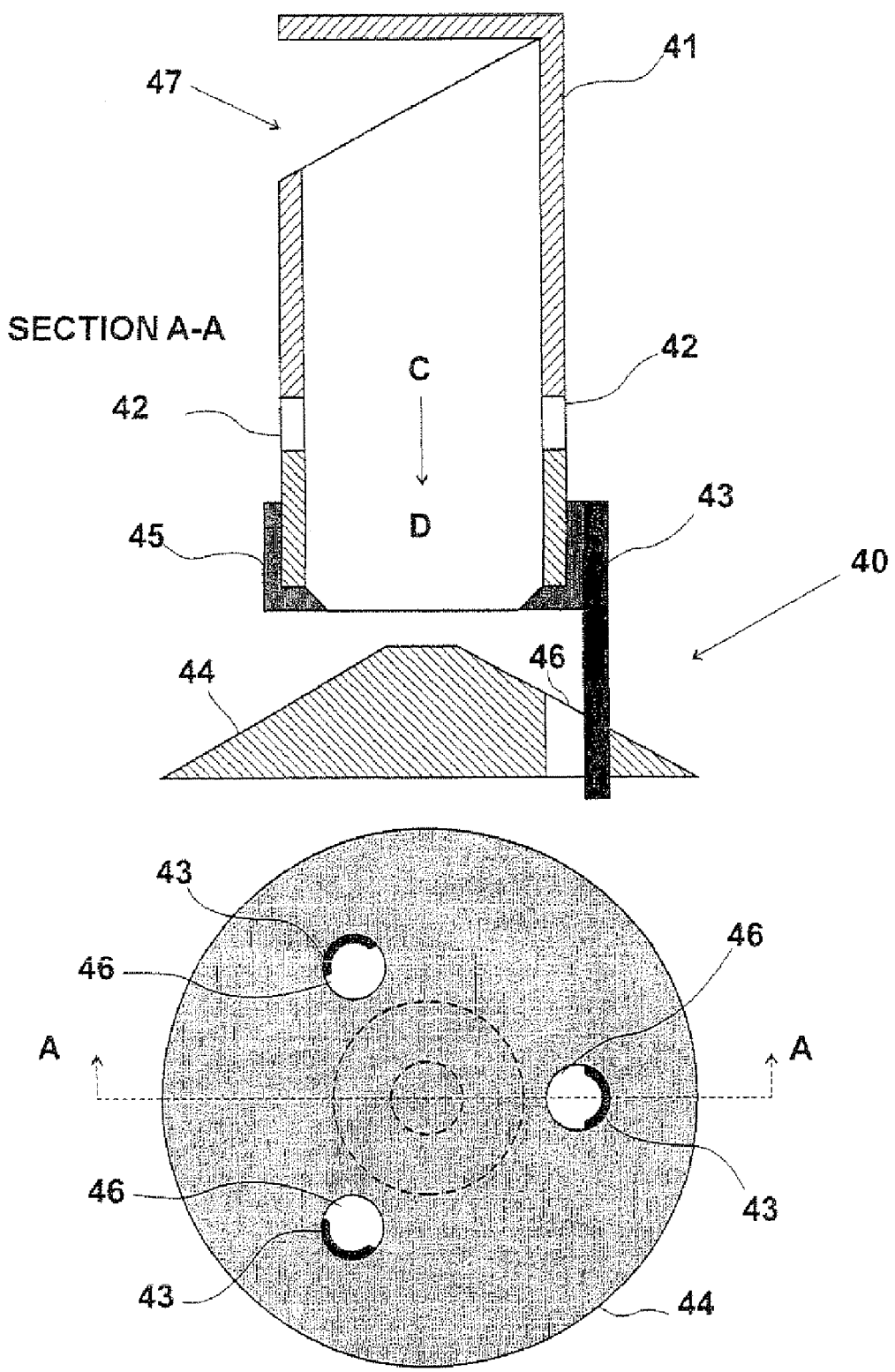
FIG. 5 shows a bottom view and a cross-section of the fourth embodiment of the distributor nozzle for a two-phase charge.

FIG. 5 shows the fourth embodiment, which is another type of distributor nozzle (40) for a two-phase charge. This device comprises a number of fixing and directing bars (43), an accelerating section (45) for the two-phase stream, and a deflector cone frustum (44). FIG. 5 also shows a shaft (41), which can be a cylindrical shell with an opening (47) at the top and a number of apertures (42), along its body.

The truncated deflector cone (44) is a solid cone frustum with an angle of 90° and three evenly spaced apertures (46) formed in the cone. The deflector cone frustum (44) is connected to the accelerating section (45) with the aid of a number of fixing and directing bars (43). The fixing and directing bars (43) are fixed to the accelerating section (45), where the diameter of the outlet end of the shaft (41) is reduced either at an angle or abruptly in order to speed up the two-phase stream and so improve its distribution. The accelerating section (45) is fixed to the bottom of the shaft (41).

At should be noted in the case of this embodiment too that the angle of the deflector cone frustum (44), the apertures (46) formed in the cone, the number of fixing and directing bars (43) and the percentage reduction in the flow area of the accelerating section (45) must not be considered to limit the scope of the invention.

The two-phase mixture is passed into the fixed-bed reactor (1) under pressure, entering the shaft (41) through both the opening (47) and the apertures (42). The vapour phase preferably enters the shaft through the opening (47), and the liquid phase preferably enters it through the apertures (42). Once in the shaft (41), the two-phase mixture moves downwards in the C-D direction. When it reaches the deflector cone frustum (44), the two-phase mixture is diverted towards the generatrix of the deflector cone frustum (44), and part of the mixture passes through the apertures (46) formed in the cone. The part of the stream passing through the apertures (46) formed in the cone is diverted by the bottom of the fixing and directing bars (43) and follows the C-D direction.

Figure 6:
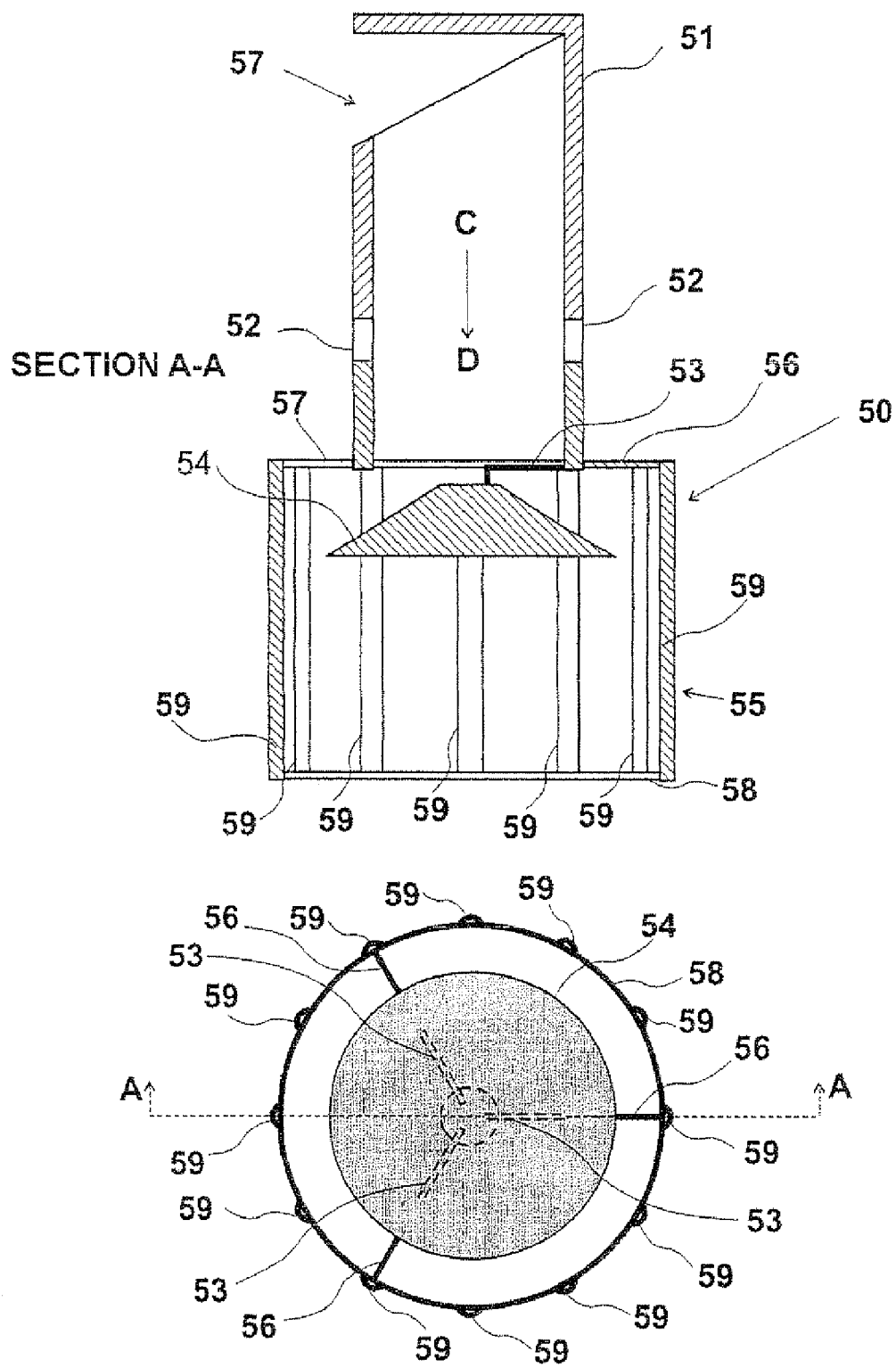
FIG. 6 shows a bottom view and a cross-section of the fifth embodiment of the distributor nozzle for a two-phase charge.

FIG. 6 shows the fifth embodiment, which is another type of distributor nozzle (50) for a two-phase charge. This device comprises a number of cone-fixing bars (53), a deflector cone frustum (54), a directing cage or frame (55) and a number of fixing bars (56) for this cage (56). FIG. 6 also shows a shaft (51), which can be a cylindrical shell with an opening (57) at the top and a number of apertures (52) along its body.

The truncated deflector cone (54) is a solid cone frustum with an angle of 90°, which is connected to the shaft (51) with the aid of a number of cone-fixing bars (53). The directing cage (55) is directly fixed to the outside of the shaft (51) with the aid of a number of cage-fixing bars (56). The directing cage (55) has an upper rim (57) and a lower rim (58), together with a number of small channels (59).

It should be noted in the case of this embodiment too that the angle of the deflector cone frustum (54), the number of cone-fixing bars (53), the number of the small channels (59) and the number of cage-fixing bars (56) must not be considered to limit the scope of the invention.

The two-phase mixture is passed into the fixed-bed reactor (1) under pressure, entering the shaft (51) both through the opening (57) and through the apertures (52). The vapour phase preferably enters the shaft through the opening (57), and the liquid phase preferably enters it through the apertures (52). Once inside the shaft (51), the two-phase mixture moves downward in the C-D direction. When it reaches the deflector cone frustum (54), the two-phase mixture is diverted towards the generatrix of the deflector cone frustum (54), and part of the mixture is diverted by the directing cage (55) and follows the C-D direction.

The components of the distributor nozzles (10, 20, 30, 40 and 50) for a two-phase charge, forming the subject of the present invention, are made of materials and means of fixing that are known from the prior art. For example, the components of the distributor nozzles (10, 20, 30, 40 and 50), for the two-phase charge can be made of carbon steel, stainless steel or any other metallic or non-metallic material that has the mechanical and physicochemical properties needed for the task in question. Moreover, the components of the distributor nozzles (10, 20, 30, 40 and 50) for a two-phase charge can be fixed by adhesive means, welding or any other means of fixing known in the prior art.

It is important to note that the shapes, dimensions and mutual position of the components of the distributor nozzles (10, 20, 30, 40 and 50) for a two-phase charge must not be considered to limit the scope of the present invention and are given here merely to demonstrate the feasibility of the embodiments.

It should also be noted here that, although the fabrication and mounting of the distributor nozzles (10, 20, 30, 40 and 50) for a two-phase charge involve the use of components known from the prior art, the arrangement described here forms a novel and innovative whole.

The invention has been described here in the form of preferred embodiments but is not limited to them. The present invention is in fact only limited to the contents of the following claims, which define its entire scope.

The invention claimed is:

1. Distributor nozzle for a two-phase charge in fixed-bed reactors, comprising:
    a deflector cone or deflector cone frustum that can be either solid or hollow, depending on its shape and manufacturing process, and which has a variable angle, or alternatively more than one angle, for improving the distribution and reducing the dry area in the "shadow" of the deflector cone or deflector cone frustum;
    fixing bars or legs for fixing the cone in the shaft, which are vertical or inclined towards the inside or outside wall of the shaft and extend from the top, bottom or side of the deflector cone or cone frustum;
    flow-redirecting devices to ensure the wetting of the region that lies directly below the cone, which devices may be formed by small channels, holes or slits in the deflector cone, by vertical extensions of the cone itself in the form of "teeth" or by a combination of these devices with the legs, in order to help to redirect part of the liquid stream, wherein
    the fixing bars fix the deflector cone frustum to the bottom of the shaft, and
    the deflector cone frustum changes the direction of part of the stream of the two-phase charge and is provided with a number of evenly spaced apertures formed in the cone, and with a number of vertical directing elements that are located at the edge of the said deflector cone frustum and are aligned with the centres of the holes, whose role is to help direct the stream of the two-phase charge.

2. Distributor nozzle for a two-phase charge in fixed-bed reactors, according to claim 1, characterized in that it comprises three fixing bars and six vertical flow-redirecting devices, while the deflector cone frustum has six apertures formed in the cone.

3. Distributor nozzle for a two-phase charge in fixed-bed reactors, according to claim 1, characterized in that it is combined with the accelerating section that is located at the bottom of the shaft and whose role is to increase the velocity of the two-phase stream and so improve its distribution.

4. Distributor nozzle for a two-phase charge in fixed-bed reactors, comprising:
    a deflector cone or deflector cone frustum that can be either solid or hollow, depending on its shape and manufacturing process, and which has a variable angle, or alternatively more than one angle, for improving the distribution and reducing the dry area in the "shadow" of the deflector cone or deflector cone frustum;
    fixing bars or legs for fixing the cone in the shaft, which are vertical or inclined towards the inside or outside wall of the shaft and extend from the top, bottom or side of the deflector cone or cone frustum;
    flow-redirecting devices to ensure the wetting of the region that lies directly below the cone, which devices may be formed by small channels, holes or slits in the deflector cone, by vertical extensions of the cone itself in the form of "teeth" or by a combination of these devices with the legs, in order to help to redirect part of the liquid stream; and
    an accelerating section that is located at the bottom of the shaft and whose role is to increase the velocity of the two-phase stream and so improve its distribution, wherein
    the fixing bars fix the deflector cone frustum to the accelerating section and help direct the stream of the two-phase charge, and
    the deflector cone frustum changes the direction of part of the stream of the two-phase charge and is provided with a number of evenly spaced apertures formed in the cone.

5. Distributor nozzle for a two-phase charge in fixed-bed reactors, according to claim 4,
    wherein the evenly spaced apertures are in the form of a number of evenly spaced slits, whose role is to help direct the stream of the two-phase charge.

6. Distributor nozzle for a two-phase charge in fixed-bed reactors, according to claim 5, characterized in that it comprises three fixing bars and three supports, while the deflector cone frustum has six slits in it.

7. Distributor nozzle for a two-phase charge in fixed-bed reactors, according to claim 4, characterized in that it comprises three fixing and directing bars, while the deflector cone frustum has three apertures formed in the cone.

8. Distributor nozzle for a two-phase charge in fixed-bed reactors, comprising:
    a deflector cone or deflector cone frustum that can be either solid or hollow, depending on its shape and manufacturing process, and which has a variable angle, or alternatively more than one angle, for improving the distribution and reducing the dry area in the "shadow" of the deflector cone or deflector cone frustum;
    fixing bars or legs for fixing the cone in the shaft, which are vertical or inclined towards the inside or outside wall of the shaft and extend from the top, bottom or side of the deflector cone or cone frustum;
    flow-redirecting devices to ensure the wetting of the region that lies directly below the cone, which devices may be formed by small channels, holes or slits in the deflector cone, by vertical extensions of the cone itself in the form of "teeth" or by a combination of these devices with the legs, in order to help to redirect part of the liquid stream; wherein
    the cone-fixing bars fix the deflector cone frustum to the inside lower end of the shaft, and further comprising:
    a directing cage, whose role is to help direct the stream of the two-phase charge;
    a number of cage-fixing bars, whose role is to fix the directing cage to the outside lower end of the shaft, wherein
    the deflector cone frustum changes the direction of part of the stream of the two-phase charge, and
    the directing cage is comprised of:
    a top rim, whose role is to carry a number of small channels;
    a bottom rim, whose role is to support a number of channels and
    a number of small channels, whose role is to help direct the stream of the two-phase charge.

9. Distributor nozzle for a two-phase charge in fixed-bed reactors, according to claim 8, characterized in that it comprises three cone-fixing bars, six cage-fixing bars and a cage with six small channels.

* * * * *